(12) United States Patent
Zhang et al.

(10) Patent No.: US 12,088,389 B2
(45) Date of Patent: Sep. 10, 2024

(54) METHODS AND DEVICES FOR RADIO BEAM DETERMINATION

(71) Applicant: Telefonaktiebolaget LM Ericsson (publ), Stockholm (SE)

(72) Inventors: Zhan Zhang, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 10 days.

(21) Appl. No.: 17/609,449

(22) PCT Filed: May 10, 2019

(86) PCT No.: PCT/CN2019/086446
§ 371 (c)(1),
(2) Date: Nov. 8, 2021

(87) PCT Pub. No.: WO2020/227859
PCT Pub. Date: Nov. 19, 2020

(65) Prior Publication Data
US 2022/0216905 A1  Jul. 7, 2022

(51) Int. Cl.
*H04B 7/06* (2006.01)

(52) U.S. Cl.
CPC ......... *H04B 7/0695* (2013.01); *H04B 7/0626* (2013.01)

(58) Field of Classification Search
CPC .... H04B 7/0695; H04B 7/088; H04B 7/0617; H04B 7/0456; H04B 7/0634;
(Continued)

(56) References Cited

U.S. PATENT DOCUMENTS 5,398,285 A * 3/1995 Borgelt ................. G06F 21/31
380/247
10,277,310 B2  4/2019 Peponides
(Continued)

FOREIGN PATENT DOCUMENTS

CN  102447502 A  5/2012
CN  104486775 A  4/2015
(Continued)

OTHER PUBLICATIONS

Bjorn Ekman "Machine Learning for Beam Based Mobility Optimization in NR", Master of Science Thesis in Communication Systems Department of Electrical Engineering, Linköping University, 2017 (available online Apr. 18, 2017), pp. 1-85. (Year: 2017).*
(Continued)

*Primary Examiner* — Sophia Vlahos
(74) *Attorney, Agent, or Firm* — Sage Patent Group

(57) ABSTRACT

Provided is a method in a network device for radio beam determination. The method includes: obtaining current information data related to a terminal device; and estimating a candidate radio beam configuration for communication with the terminal device based on the current information data by using a probabilistic mechanism, algorithm or policy that is obtained by analyzing historical radio beam configurations for communication with the terminal device and history information data related to the terminal.

18 Claims, 8 Drawing Sheets

(58) Field of Classification Search
CPC .. H04B 7/0639; H04B 7/0691; H04B 7/0626; G06N 20/00; G06N 3/08; G06N 3/047; G06N 3/088; G06N 7/01; G06N 3/09; G06N 3/091; G06N 3/092; G06N 20/10; G06N 3/126

See application file for complete search history.

(56) References Cited

U.S. PATENT DOCUMENTS

| | | | |
|---|---|---|---|
| 11,595,102 B2* | 2/2023 | Pezeshki | H04B 7/0695 |
| 2014/0177607 A1* | 6/2014 | Li | H04B 7/0695 370/336 |
| 2016/0195603 A1* | 7/2016 | Li | H04W 64/00 455/456.1 |
| 2018/0070363 A1* | 3/2018 | Chakraborty | H04B 17/318 |
| 2018/0152933 A1* | 5/2018 | Berglund | H04W 72/046 |
| 2019/0045414 A1* | 2/2019 | Guerreiro | H04W 72/046 |
| 2019/0059004 A1* | 2/2019 | Norita | H04B 7/0617 |
| 2019/0097712 A1* | 3/2019 | Singh | H04B 7/0617 |
| 2019/0191425 A1* | 6/2019 | Zhu | H04W 72/046 |
| 2019/0372644 A1* | 12/2019 | Chen | H04W 88/12 |
| 2020/0259545 A1* | 8/2020 | Bai | H04B 7/0626 |
| 2021/0351885 A1* | 11/2021 | Chavva | H04B 7/0626 |
| 2022/0060240 A1* | 2/2022 | Xia | H04B 7/088 |
| 2022/0190883 A1* | 6/2022 | Kaya | H04W 36/08 |

FOREIGN PATENT DOCUMENTS

| | | | | |
|---|---|---|---|---|
| CN | 108966352 A | | 12/2018 | |
| CN | 109673051 A | | 4/2019 | |
| WO | WO-2018142021 A1 | * | 8/2018 | |
| WO | WO-2019062736 A1 | * | 4/2019 | .......... H04B 17/318 |

OTHER PUBLICATIONS

International Search Report and Written Opinion of the International Searching Authority, PCT/CN2019/086446, mailed Feb. 6, 2020, 9 pages.

Anton-Haro, C., et al., "Learning And Data-Driven Beam Selection for mmWave Communications: An Angle of Arrival-Based Approach," IEEE, Feb. 22, 2019, vol. No. 7, pp. 20404-20415.

* cited by examiner

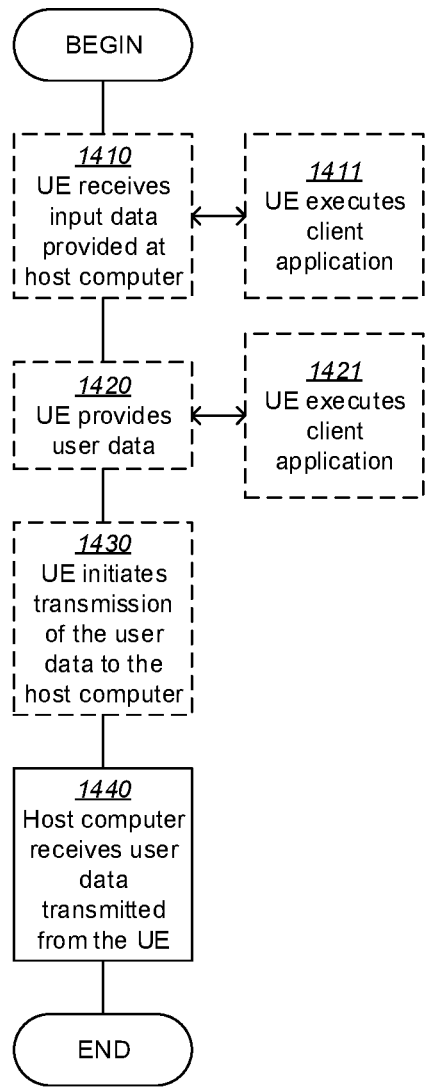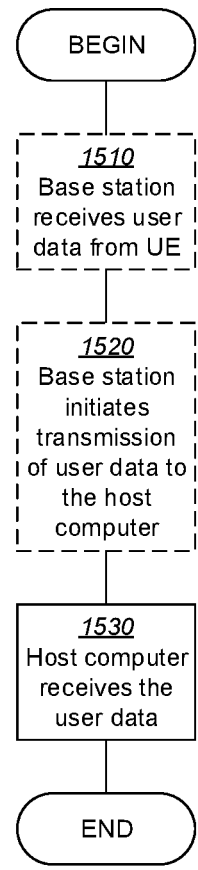
FIG. 14
FIG. 15

METHODS AND DEVICES FOR RADIO BEAM DETERMINATION

CROSS REFERENCE TO RELATED APPLICATIONS

This application is a 35 U.S.C. § 371 national stage application of PCT International Application No. PCT/CN2019/086446 filed on May 10, 2019, the disclosure and content of which is incorporated by reference herein in its entirety.

TECHNICAL FIELD

The present disclosure relates to radio communication, and more particularly, to methods and devices for radio beam determination.

BACKGROUND

Multi-antenna systems employ a number of antennas or antenna arrays, enabling higher reliability, higher throughput or both by providing transmission diversity gain, spatial multiplexing gain, and/or beam-forming gain. Among multiple-antenna techniques, beamforming focuses transmission and reception of signal energy into a target direction, so as to bring huge improvements in signal strength received by terminal devices. When combined with proper scheduling of many terminal devices, a system-wide spectrum efficiency could be achieved.

For multi-antenna systems, in order to maximize Multiple Input Multiple Output (MIMO) benefits, spatial domain processing is typically applied at both the network side and the terminal side. Therefore, accurate Channel State Information (CSI) needs to be available at a network device (e.g., an evolved NodeB (eNB) or gNB). More accurate CSI can lead to better spatial processing and thus greater MIMO benefits in either reliability or spectrum efficiency. However, it may take a remarkable ratio of radio resources to obtain highly accurate CSI for spatial processing, especially for a system having a large number of antennas or antenna arrays, e.g., massive antenna array(s) at a gNB and an antenna array at each terminal device. According to existing schemes which are based on measurement reports from terminal devices, a remarkable amount of uplink resources will be used to report CSI to gNB, which is a non-trivial problem for uplink capacity and sometimes even a challenge in scenarios with limited uplink coverage. For New Radio (NR) operating at millimeter wave (mmW) bands, due to significant free space loss, directional beams are desired for transmission of signals, including control signals, even at the initial access stage. Beam steering and beam management costs in term of reference signal radio resource and management/reporting delay become increasingly critical burden to Radio Access Network (RAN) operations.

In addition, operators are expecting to provide data traffic over wider frequency bandwidths in higher frequency bands, e.g., 26 GHz band (25.25-27.5 GHz) and 42-42.5 GHz band. Such high carrier frequencies (e.g., mmWave) have much higher path losses and therefore usually have smaller coverage ranges. To achieve high performance in both coverage and throughput in the $5^{th}$ Generation (5G) NR system, operators may need to deploy 5G/4.5G macro coverage with overlapping multiple-bands, e.g., so-called "2-layer coverage". To allow terminal devices to be served by such 2-layer coverage, the $3^{rd}$ Generation Partnership Project (3GPP) provides a number of flexible solutions, such as Dual Connectivity (DC), Multiple Connectivity (MC), Carrier Aggregation (CA) or Supplementary Downlink (SDL) or Supplementary Uplink (SUL). In the SDL or SUL scheme for example, there is only one link, either downlink or uplink, in one frequency band. This rules out the possibility of so-called "reciprocity-based scheme", which uses the uplink (or downlink) CSI to determine downlink (uplink) beamforming weights. In this case, for example, downlink beamforming weights needs to be determined based on CSI feedback from a terminal device.

Further, for downlink reference signals with beamforming, frequent periodic or aperiodic beam-sweeping operations may be needed, which will occupy considerable resources especially when highly accurate beams (narrow beams) are expected to be identified.

Hence, it is desired to mitigate the problem associated with overheads and/or delays associated with reference signals and measurement reports required for obtaining and/or reporting CSI, especially for massive MIMO systems.

SUMMARY

It is an object of the present disclosure to provide methods and devices for radio beam determination, capable of determining a radio beam configuration in a more efficient manner.

In a first aspect of the present disclosure, a method in a network device for radio beam determination is provided. The method includes: obtaining current information data related to a terminal device; and estimating a candidate radio beam configuration for communication with the terminal device based on the current information data by using a probabilistic mechanism, algorithm or policy that is obtained by analyzing historical radio beam configurations for communication with the terminal device and history information data related to the terminal.

In an embodiment, the historical radio beam configurations may include historical radio beam configurations for radio beams at the network device for transmission to the terminal device and/or reception from the terminal device, and/or radio beams at the terminal device for transmission to the network device and/or reception from the network device, and/or the candidate radio beam configuration may include a candidate radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

In an embodiment, the historical information data may include one or more of: historical channel configurations or measurements between the terminal device and the network device over one or more carriers or sub-carriers, historical channel configurations or measurements between the terminal device and one or more other network devices, or historical geographical positions of the terminal device. The current information data may include one or more of: a current channel configuration or measurement between the terminal device and the network device over one or more carriers or sub-carriers, a current channel configuration or measurement between the terminal device and one or more other network devices, or a current geographical position of the terminal device.

In an embodiment, the historical channel configurations may include historical cell and/or sector configurations, historical time-frequency resource allocations, historical beamforming weight matrixes or vectors, and/or historical radio beam direction parameters, and the current channel configuration may include a current cell and/or sector configuration, a current time-frequency resource allocation, a current beamforming weight matrix or vector, and/or a current radio beam direction parameter.

In an embodiment, the historical channel measurements may include historical measurements on CSI, received signal power or received signal strength, spatial channel status, angle of signal arrival, angle of signal departure, and/or channel status of antenna panel or array, and/or the current channel measurement may include a current measurement on CSI, received signal power or received signal strength, spatial channel status, angle of signal arrival, angle of signal departure, and/or channel status of an antenna panel or array.

In an embodiment, the network device and the one or more other network devices may include network devices serving the terminal device in a Dual Connectivity (DC), Multiple Connectivity (MC) or Carrier Aggregation (CA) configuration, or Transmitting/Receiving Points (TRPs) in a Coordinated Multi-Point (CoMP) set for the terminal device.

In an embodiment, the network device and the one or more other network devices may include network devices utilizing different Radio Access Technologies (RATs).

In an embodiment, each historical radio beam configuration may be associated with one or more pieces of the historical information data that are obtained in association with the historical radio beam configuration, or occur within a predetermined time period relative to the historical radio beam configuration.

In an embodiment, the operation of estimating may include: selecting, as the candidate radio beam configuration, one of the historical radio beam configurations that has a highest conditional probability given the current information data, by using the probabilistic mechanism, algorithm or policy.

In an embodiment, the method may further include: determining the candidate radio beam configuration as a current radio beam configuration for communication with the terminal device.

In an embodiment, the method may further include: determining the candidate radio beam configuration as a current radio beam configuration for communication with the terminal device only when the highest conditional probability is higher than or equal to a predetermined threshold, or determining the current radio beam configuration for communication with the terminal device based on CSI measured at the network device or received from the terminal device, when the highest conditional probability is lower than the predetermined threshold.

In an embodiment, the method may further include: updating the historical radio beam configurations with the current radio beam configuration, and updating the historical information data with the current information data; and/or updating the probabilistic mechanism, algorithm or policy in accordance with the updated historical beam configurations and the updated historical information data.

In an embodiment, the method may further include: signaling the current radio beam configuration to the terminal device.

In an embodiment, the probabilistic mechanism, algorithm or policy may be created or trained at the network device.

In an embodiment, the probabilistic mechanism, algorithm or policy may be created or trained by means of neural network based machine learning, Supporting Vector Machine (SVM) or Bayesian statistical estimation.

In an embodiment, the method may further include: recording the historical radio beam configurations and the history information data at the network device. The historical information data and the current information data are measured at the network device and/or received from the terminal device.

In an embodiment, the method may further include: receiving the probabilistic mechanism, algorithm or policy from a network node.

In an embodiment, the method may further include: signaling the current radio beam configuration and the current information data to the network node.

In a second aspect of the present disclosure, a network device is provided. The network device includes a communication interface, a processor and a memory. The memory contains instructions executable by the processor whereby the network device is operative to perform the method according to the above first aspect.

In a third aspect of the present disclosure, a computer readable storage medium is provided. The computer readable storage medium has computer program instructions stored thereon. The computer program instructions, when executed by a processor in a network device, cause the network device to perform the method according to the above first aspect.

In a fourth aspect of the present disclosure, a method in a network node for facilitating radio beam determination is provided. The method includes: recording historical radio beam configurations for communication between a network device and a terminal device and history information data related to the terminal; and obtaining a probabilistic mechanism, algorithm or policy by analyzing the historical radio beam configurations and the history information data.

In an embodiment, the historical radio beam configurations may include historical radio beam configurations for radio beams at the network device for transmission to the terminal device and/or reception from the terminal device, and/or radio beams at the terminal device for transmission to the network device and/or reception from the network device, and/or the candidate radio beam configuration may include a candidate radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

In an embodiment, the historical information data may include one or more of: historical channel configurations or measurements between the terminal device and the network device over one or more carriers or sub-carriers, historical channel configurations or measurements between the terminal device and one or more other network devices, or historical geographical positions of the terminal device. The current information data may include one or more of: a current channel configuration or measurement between the terminal device and the network device over one or more carriers or sub-carriers, a current channel configuration or measurement between the terminal device and one or more other network devices, or a current geographical position of the terminal device.

In an embodiment, the historical channel configurations may include historical cell and/or sector configurations, historical time-frequency resource allocations, historical beamforming weight matrixes or vectors, and/or historical radio beam direction parameters, and the current channel configuration may include a current cell and/or sector configuration, a current time-frequency resource allocation, a current beamforming weight matrix or vector, and/or a current radio beam direction parameter.

In an embodiment, the historical channel measurements may include historical measurements on CSI received signal power or received signal strength, spatial channel status, angle of signal arrival, angle of signal departure, and/or channel status of antenna panel or array, and/or the current channel measurement may include a current measurement on CSI, received signal power or received signal strength, spatial channel status, angle of signal arrival, angle of signal departure, and/or channel status of an antenna panel or array.

In an embodiment, the network device and the one or more other network devices may include network devices serving the terminal device in a DC, MC or CA configuration, or TRPs in a CoMP set for the terminal device.

In an embodiment, the network device and the one or more other network devices may include network devices utilizing different RATs.

In an embodiment, each historical radio beam configuration may be associated with one or more pieces of the historical information data that are obtained in association with the historical radio beam configuration, or occur within a predetermined time period relative to the historical radio beam configuration.

In an embodiment, the method may further include: receiving current information data related to the terminal; and estimating a candidate radio beam configuration for communication between the network device and the terminal device based on the current information data by using the probabilistic mechanism, algorithm or policy.

In an embodiment, the operation of estimating may include: selecting, as the candidate radio beam configuration, one of the historical radio beam configurations that has a highest conditional probability given the current information data, by using the probabilistic mechanism, algorithm or policy.

In an embodiment, the method may further include: determining the candidate radio beam configuration as a current radio beam configuration for communication between the network device and the terminal device.

In an embodiment, the method may further include: determining the candidate radio beam configuration as a current radio beam configuration for communication between the network device and the terminal device only when the highest conditional probability is higher than or equal to a predetermined threshold.

In an embodiment, the method may further include: updating the historical radio beam configurations with the current radio beam configuration, and updating the historical information data with the current information data; and/or updating the probabilistic mechanism, algorithm or policy in accordance with the updated historical beam configurations and the updated historical information data.

In an embodiment, the method may further include: signaling the probabilistic mechanism, algorithm or policy to the network device, to enable the network device to determine a current radio beam configuration for communication between the network device and the terminal device based on current information data related to the terminal by using the probabilistic mechanism, algorithm or policy.

In an embodiment, the method may further include: receiving the current radio beam configuration and the current information data from the network device; updating the historical radio beam configurations with the current radio beam configuration, and updating the historical information data with the current information data; and/or updating the probabilistic mechanism, algorithm or policy in accordance with the updated historical beam configurations and the updated historical information data.

In an embodiment, the probabilistic mechanism, algorithm or policy is created or trained by means of neural network based machine learning, SVM or Bayesian statistical estimation.

In an embodiment, the method may further include: transmitting to at least the network device an instruction to report the historical radio beam configurations, the historical information data and/or the current information data to the network node; and receiving the historical radio beam configurations, the historical information data and/or the current information data from at least the network device.

In an embodiment, the method may further include: configuring channel measurement parameters for at least the network device, the channel measurement parameters including one or more of: a period at which channel measurements are to be performed, a measurement type, a data sharing or exchanging protocol between at least the network device and the network node, or a reference signal configuration. The historical information data and/or the current information data may be at least partially obtained by at least the network device performing channel measurements in accordance with the channel measurement parameters.

In an embodiment, the network node may be a centralized control node or a coordinating device, an Operation Administration and Maintenance (OAM) node of a core network or a Radio Access Network (RAN), an edge computing node, or a server accessible by the network device.

In a fifth aspect of the present disclosure, a network node is provided. The network node includes a communication interface, a processor and a memory. The memory contains instructions executable by the processor whereby the network node is operative to perform the method according to the above fourth aspect.

In a sixth aspect of the present disclosure, a computer readable storage medium is provided. The computer readable storage medium has computer program instructions stored thereon. The computer program instructions, when executed by a processor in a network node, cause the network node to perform the method according to the above fourth aspect.

In a seventh aspect of the present disclosure, a method in a terminal device for radio beam determination is provided. The method includes: receiving from a network device a current radio beam configuration for communication with the network device. The current radio beam configuration is determined based on current information data related to the terminal device by using a probabilistic mechanism, algorithm or policy that is obtained by analyzing historical radio beam configurations for communication with the network device and history information data related to the terminal.

In an embodiment, the historical radio beam configurations may include historical radio beam configurations for radio beams at the network device for transmission to the terminal device and/or reception from the terminal device, and/or radio beams at the terminal device for transmission to the network device and/or reception from the network device, and/or the current radio beam configuration may include a current radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

In an embodiment, the historical information data may include one or more of: historical channel configurations or measurements between the terminal device and the network device over one or more carriers or sub-carriers, historical channel configurations or measurements between the terminal device and one or more other network devices, or historical geographical positions of the terminal device. The current information data may include one or more of: a current channel configuration or measurement between the terminal device and the network device over one or more carriers or sub-carriers, a current channel configuration or measurement between the terminal device and one or more other network devices, or a current geographical position of the terminal device.

In an embodiment, the historical channel configurations may include historical cell and/or sector configurations, historical time-frequency resource allocations, historical beamforming weight matrixes or vectors, and/or historical radio beam direction parameters, and the current channel configuration may include a current cell and/or sector configuration, a current time-frequency resource allocation, a current beamforming weight matrix or vector, and/or a current radio beam direction parameter.

In an embodiment, the historical channel measurements may include historical measurements on CSI received signal power or received signal strength, spatial channel status, angle of signal arrival, angle of signal departure, and/or channel status of antenna panel or array, and/or the current channel measurement may include a current measurement on CSI, received signal power or received signal strength, spatial channel status, angle of signal arrival, angle of signal departure, and/or channel status of an antenna panel or array.

In an embodiment, the network device and the one or more other network devices may include network devices serving the terminal device in a DC, MC or CA configuration, or TRPs in a CoMP set for the terminal device.

In an embodiment, the network device and the one or more other network devices may include network devices utilizing different RATs.

In an embodiment, the probabilistic mechanism, algorithm or policy is created or trained by means of neural network based machine learning, SVM or Bayesian statistical estimation.

In an embodiment, the method may further include transmitting the current information data to the network device.

In an eighth aspect of the present disclosure, a terminal device is provided. The terminal device includes a communication interface, a processor and a memory. The memory contains instructions executable by the processor whereby the terminal device is operative to perform the method according to the above seventh aspect.

In a ninth aspect of the present disclosure, a computer readable storage medium is provided. The computer readable storage medium has computer program instructions stored thereon. The computer program instructions, when executed by a processor in a terminal device, cause the terminal device to perform the method according to the above seventh aspect.

With the embodiments of the present disclosure, a network device can obtain current information data related to a terminal device and estimate a candidate radio beam configuration for communication with the terminal device based on the current information data by using a probabilistic mechanism, algorithm or policy that is obtained by analyzing historical radio beam configurations for communication with the terminal device and history information data related to the terminal. In this way, the network device can determine a radio beam configuration for communication with the terminal device in a more efficient manner, as overheads and/or delays associated with reference signals and measurement reports required for obtaining and/or reporting CSI can be eliminated or at least reduced.

BRIEF DESCRIPTION OF THE DRAWINGS

The above and other objects, features and advantages will be more apparent from the following description of embodiments with reference to the figures, in which:

FIGS. 12 to 15 are flowcharts illustrating methods implemented in a communication system including a host computer, a base station and a user equipment.

DETAILED DESCRIPTION

Figure 1:
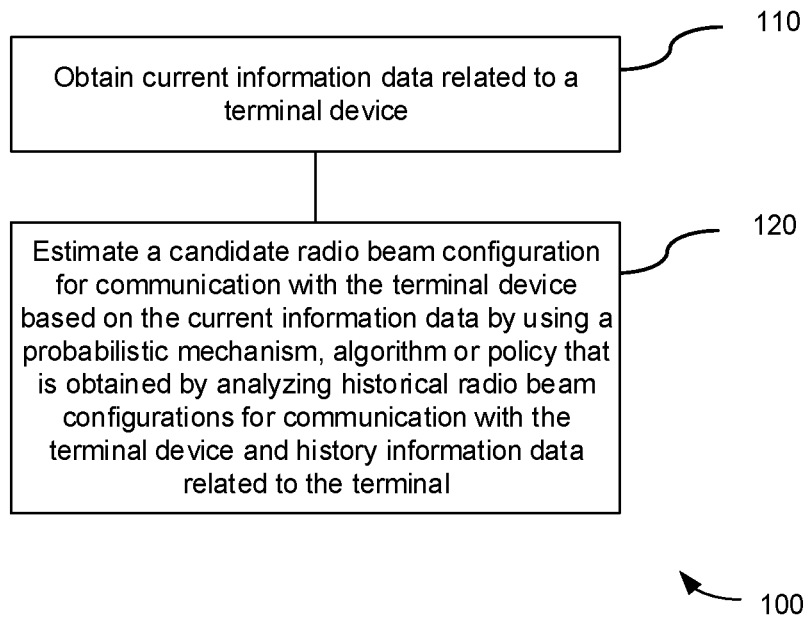
FIG. 1 is a flowchart illustrating a method for radio beam determination according to an embodiment of the present disclosure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In a typical DC scenario in NR or LTE, a gNB manages both Layer 1 (L1) baseband units and Radio Frequency (RF) band units of two radio points at (quasi-)collocated sites having antenna arrays operating in different frequency carriers with a frequency gap with respect to a neighboring band of carriers. The two radio points may serve same or different UEs. From radio propagation point of views, there may be a mapping relation, either deterministic or statistical, between beams of these radio points, but such relation is unknown at manufacture as the deployment of the radio points and the environment in which the radio points are deployed could be dramatically different from one site to another. Once the radio points have been deployed, such mapping relation (either deterministic or statistical) can be derived by means of e.g., data-mining. With the mapping relation, the gNB may not need to transmit reference signals, or at least may not need to transmit the reference signals frequently, in order to determine one or more beams to be used by one radio point for communication with a UE when the beam(s) used by the other radio point for communication with the UE is already known. In other words, such DC radio points (within one gNB or different gNBs) could utilize the mapping relation to save at least half resources for reference signals and measurement reports. Even more resources can be saved in MC scenarios.

Similarly, in a CA scenario, either intra-band or inter-band CA, there may be a mapping relation between beams used in different carriers for communication with a UE, and such mapping relation can be derived by means of e.g., data-mining and utilized to save resources for reference signals and measurement reports. In a dynamic multi-point selection scenario, beam configurations for some TRPs may be useful in determining beam configurations for other TRPs in a CoMP set. In an SDL or SUL scenario, like the inter-band CA scenario, SDL or SUL beam configurations can be determined at least partially based on beamforming parameters for other links in same or different uplink or downlink frequencies.

FIG. 1 is a flowchart illustrating a method 100 for radio beam determination according to an embodiment of the present disclosure. The method 100 can be performed at a network device, e.g., a gNB.

At block 110, current information data related to a terminal device is obtained.

At block 120, a candidate radio beam configuration for communication with the terminal device is estimated based on the current information data by using a probabilistic mechanism, algorithm or policy that is obtained by analyzing historical radio beam configurations for communication with the terminal device and history information data related to the terminal.

In an example, the probabilistic mechanism, algorithm or policy can be created or trained at the network device, e.g., by means of neural network based machine learning, SVM or Bayesian statistical estimation. In this case, the historical radio beam configurations and the history information data can be recorded at the network device. Here, the historical information data and the current information data can be measured at the network device and/or received from the terminal device.

Alternatively, the probabilistic mechanism, algorithm or policy can be received from a network node, e.g., a centralized control node or a coordinating device, an Operation Administration and Maintenance (OAM) node of a core network or a Radio Access Network (RAN), an edge computing node, or a server accessible by the network device.

In an example, the historical radio beam configurations may include historical radio beam configurations for radio beams at the network device for transmission to the terminal device and/or reception from the terminal device, and/or radio beams at the terminal device for transmission to the network device and/or reception from the network device. The candidate radio beam configuration may include a candidate radio beam configuration for a radio beam at the network device for transmission to the terminal device, a radio beam at the network device for reception from the terminal device, a radio beam at the terminal device for transmission to the network device, and/or a radio beam at the terminal device for reception from the network device. The term "radio beam configuration" as used herein may refer to a beam weight, a beam coefficient and/or a beam index in a codebook.

The historical information data may include one or more of: historical channel configurations or measurements between the terminal device and the network device over one or more carriers or sub-carriers, historical channel configurations or measurements between the terminal device and one or more other network devices, or historical geographical positions (e.g., Global Positioning System (GPS) coordinates) of the terminal device. In particular, the historical channel configurations may include historical cell and/or sector configurations, historical time-frequency resource allocations, historical beamforming weight matrixes or vectors, and/or historical radio beam direction parameters. The historical channel measurements may include historical measurements on CSI received signal power or received signal strength, spatial channel status, angle of signal arrival, angle of signal departure, and/or channel status of antenna panel or array. The current information data may include one or more of: a current channel configuration or measurement between the terminal device and the network device over one or more carriers or sub-carriers, a current channel configuration or measurement between the terminal device and one or more other network devices, or a current geographical position (e.g., GPS coordinates) of the terminal device. In particular, the current channel configuration may include a current cell and/or sector configuration, a current time-frequency resource allocation, a current beamforming weight matrix or vector, and/or a current radio beam direction parameter. The current channel measurement may include a current measurement on CSI, received signal power or received signal strength, spatial channel status, angle of signal arrival, angle of signal departure, and/or channel status of an antenna panel or array.

Here, the network device and the one or more other network devices may include network devices serving the terminal device in a Dual Connectivity (DC), Multiple Connectivity (MC) or Carrier Aggregation (CA) configuration, or Transmitting/Receiving Points (TRPs) in a Coordinated Multi-Point (CoMP) set for the terminal device. The network device and the one or more other network devices may include network devices utilizing different Radio Access Technologies (RATs), e.g., NR or LTE or non-3GPP RATs such as Wireless Local Area Network (WLAN).

In an example, each historical radio beam configuration may be associated with one or more pieces of the historical information data that are obtained in association with the historical radio beam configuration, or occur within a predetermined time period relative to the historical radio beam configuration. In other words, when the historical radio beam configurations and the history information data are analyzed to obtain the probabilistic mechanism, algorithm or policy, each historical radio beam configuration is considered to be relevant only to the historical information data that is obtained in association with the historical radio beam configuration, or occur within the predetermined time period relative to the historical radio beam configuration.

In an example, in the block 120, one of the historical radio beam configurations that has a highest conditional probability given the current information data is selected as the candidate radio beam configuration by using the probabilistic mechanism, algorithm or policy.

As a non-limiting example, the historical radio beam configurations may contain historical beam indexes used by the network device for transmission to the terminal device and the history information data may contain historical cell configurations, sector configurations and frequency resource allocation. Assuming that b111 denotes a beam index for used by the network device for transmission to the terminal device in NR Cell 1, Sector 1 at Carrier Frequency 1, b211 denotes a beam index for used by the network device for transmission to the terminal device in LTE Cell 1, Sector 1 at Carrier Frequency 2, b112 denotes a historical beam index for used by the network device for transmission to the terminal device in NR Cell 1, Sector 2 at Carrier Frequency 1, and b222 denotes a historical beam index for used by the network device for transmission to the terminal device in LTE Cell 2, Sector 2 at Carrier Frequency 2, when b211=j, b112=p and b222=q currently, b111 can be determined such that the conditional probability P is maximized:

$$i = \mathrm{argmax}\{P(b111=i|b211=j, b112=p, b222=q)\} \quad (1)$$

where i is the beam index for b111.

As another non-limiting example, the historical radio beam configurations may contain historical beam indexes used by the network device for transmission to the terminal device and the history information data may contain historical Reference Signal Received Powers (RSRPs) for respective beams, e.g., L1-RSRPs which are L1 RSRP measurements of either System/Synchronization Signal (SS)/Physical Broadcast Channel (PBCH) Blocks (SSBs), or periodic/semi-persistent CSI Reference Signals (CSI-RSs) assigned and shared among UEs. In this case, when current RSRPs for beams beam_u, beam_v and beam_m are known, a beam index n can be determined such that the conditional probability P is maximized:

$$n = \mathrm{argmax}\{P(\text{beam index}=n|\text{RSRP}(\text{beam}\_u), \text{RSRP}(\text{beam}\_v), \text{RSRP}(\text{beam}\_m))\} \quad (2)$$

where RSRP(beam_u), RSRP(beam_v) and RSRP(beam_m) denote the current RSRPs for beams beam_u, beam_v and beam_m, respectively.

Additionally or alternatively to the RSRP, any of the above information data, including CSI, Angle of Arrival (AoA), Angle of Departure (AoD) or GPS coordinates, can be used in the above Equation (2) to determine the beam index of interest.

In an example, the candidate radio beam configuration estimated in the block 120 can be determined directly as a current radio beam configuration for communication with the terminal device.

Alternatively, the candidate radio beam configuration estimated in the block 120 can be determined as a current radio beam configuration for communication with the terminal device only when the highest conditional probability is higher than or equal to a predetermined threshold. When the highest conditional probability is lower than the predetermined threshold, the current radio beam configuration for communication with the terminal device can be determined based on CSI measured at the network device or received from the terminal device.

When the historical radio beam configurations and the history information data are recorded at the network device, the historical radio beam configurations can be updated with the current radio beam configuration, and the historical information data can be updated with the current information data. When the probabilistic mechanism, algorithm or policy is received from the network node and the historical radio beam configurations and the history information data are recorded at the network node, the current radio beam configuration and the current information data can be signaled to the network node. Further, when the probabilistic mechanism, algorithm or policy is created or trained at the network device, the probabilistic mechanism, algorithm or policy can be updated at the network device in accordance with the updated historical beam configurations and the updated historical information data.

In an example, the current radio beam configuration can be signaled to the terminal device, such that the terminal device can determine the radio beam at the terminal device for transmission to the network device, and/or the radio beam at the terminal device for reception from the network device.

Figure 2:
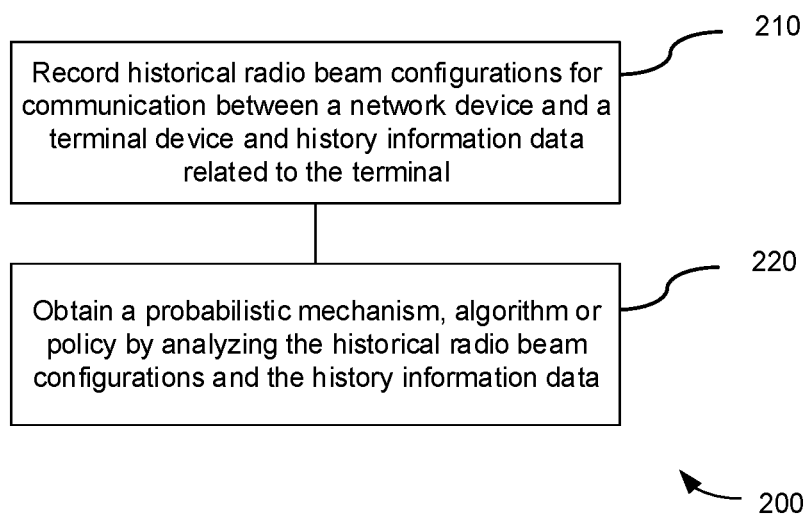
FIG. 2 is a flowchart illustrating a method for facilitating radio beam determination according to an embodiment of the present disclosure.

FIG. 2 is a flowchart illustrating a method 200 for facilitating radio beam determination according to an embodiment of the present disclosure. The method 200 can be performed at a network node, e.g., a centralized control node or a coordinating device, an OAM node of a core network or a RAN, an edge computing node, or a server accessible by the network device.

At block 210, historical radio beam configurations for communication between a network device and a terminal device and history information data related to the terminal are recorded.

At block 220, a probabilistic mechanism, algorithm or policy is obtained by analyzing the historical radio beam configurations and the history information data.

In an example, the historical radio beam configurations may include historical radio beam configurations for radio beams at the network device for transmission to the terminal device and/or reception from the terminal device, and/or radio beams at the terminal device for transmission to the network device and/or reception from the network device. The candidate radio beam configuration may include a candidate radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

In an example, the historical information data may include one or more of: historical channel configurations or measurements between the terminal device and the network device over one or more carriers or sub-carriers, historical channel configurations or measurements between the terminal device and one or more other network devices, or historical geographical positions (e.g., GPS coordinates) of the terminal device. In particular, the historical channel configurations may include historical cell and/or sector configurations, historical time-frequency resource allocations, historical beamforming weight matrixes or vectors, and/or historical radio beam direction parameters, and the historical channel measurements may include historical measurements on CSI, received signal power or received signal strength, spatial channel status, angle of signal arrival, angle of signal departure, and/or channel status of antenna panel or array. The current information data may include one or more of: a current channel configuration or measurement between the terminal device and the network device over one or more carriers or sub-carriers, a current channel configuration or measurement between the terminal device and one or more other network devices, or a current geographical position (e.g., GPS coordinates) of the terminal device. In particular, the current channel configuration may include a current cell and/or sector configuration, a current time-frequency resource allocation, a current beamforming weight matrix or vector, and/or a current radio beam direction parameter, and the current channel measurement may include a current measurement on CSI, received signal power or received signal strength, spatial channel status, angle of signal arrival, angle of signal departure, and/or channel status of an antenna panel or array.

Here, the network device and the one or more other network devices may include network devices serving the terminal device in a DC, MC or CA configuration, or TRPs in a CoMP set for the terminal device. The network device and the one or more other network devices may include network devices utilizing different RATs, e.g., NR or LTE or non-3GPP RATs such as WLAN.

In an example, each historical radio beam configuration may be associated with one or more pieces of the historical information data that are obtained in association with the historical radio beam configuration, or occur within a predetermined time period relative to the historical radio beam configuration. In other words, when the historical radio beam configurations and the history information data are analyzed to obtain the probabilistic mechanism, algorithm or policy in the block 220, each historical radio beam configuration is considered to be relevant only to the historical information data that is obtained in association with the historical radio beam configuration, or occur within the predetermined time period relative to the historical radio beam configuration.

In an example, the method 200 may further include: receiving current information data related to the terminal; and estimating a candidate radio beam configuration for communication between the network device and the terminal device based on the current information data by using the probabilistic mechanism, algorithm or policy. Here, one of the historical radio beam configurations that has a highest conditional probability given the current information data can be selected as the candidate radio beam configuration, by using the probabilistic mechanism, algorithm or policy. Further, the candidate radio beam configuration can be determined directly as a current radio beam configuration for communication between the network device and the terminal device. Alternatively, the candidate radio beam configuration can be determined as a current radio beam configuration for communication between the network device and the terminal device only when the highest conditional probability is higher than or equal to a predetermined threshold. When the highest conditional probability is lower than the predetermined threshold, the current radio beam configuration can be determined by the network device based on CSI, as described above in connection with FIG. 1. Then, the historical radio beam configurations can be updated with the current radio beam configuration, and the historical information data can be updated with the current information data. Further, the probabilistic mechanism, algorithm or policy can be updated in accordance with the updated historical beam configurations and the updated historical information data.

Alternatively, the method 200 can further include: signaling the probabilistic mechanism, algorithm or policy to the network device, to enable the network device to determine a current radio beam configuration for communication between the network device and the terminal device based on current information data related to the terminal by using the probabilistic mechanism, algorithm or policy. The method 200 may further include: receiving the current radio beam configuration and the current information data from the network device. Then, the historical radio beam configurations can be updated with the current radio beam configuration, and the historical information data can be updated with the current information data. Further, the probabilistic mechanism, algorithm or policy can be updated in accordance with the updated historical beam configurations and the updated historical information data.

In an example, the probabilistic mechanism, algorithm or policy can be created or trained by means of neural network based machine learning, SVM or Bayesian statistical estimation.

In an example, an instruction to report the historical radio beam configurations, the historical information data and/or the current information data to the network node can be transmitted to at least the network device, and the historical radio beam configurations, the historical information data and/or the current information data can be received from at least the network device.

In an example, the network node can configure channel measurement parameters for at least the network device. The channel measurement parameters may include one or more of: a period at which channel measurements are to be performed, a measurement type, a data sharing or exchanging protocol between at least the network device and the network node, or a reference signal configuration. The historical information data and/or the current information data can be at least partially obtained by at least the network device performing channel measurements in accordance with the channel measurement parameters.

Figure 3:
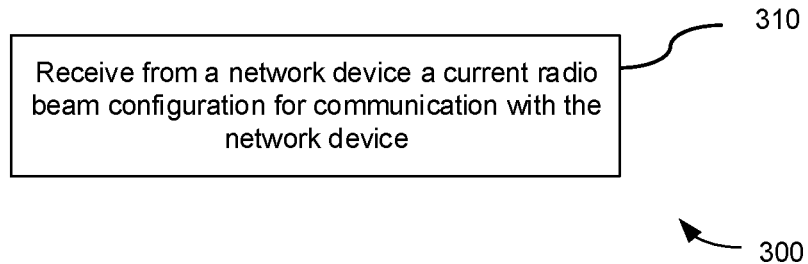
FIG. 3 is a flowchart illustrating a method for radio beam determination according to another embodiment of the present disclosure.

FIG. 3 is a flowchart illustrating a method 300 for radio beam determination according to another embodiment of the present disclosure. The method 300 can be performed at a terminal device, e.g., a UE.

At block 310, a current radio beam configuration for communication with the network device is received from a network device. The current radio beam configuration is determined based on current information data related to the terminal device by using a probabilistic mechanism, algorithm or policy that is obtained by analyzing historical radio beam configurations for communication with the network device and history information data related to the terminal.

In an example, the method 300 may further include: transmitting the current information data to the network device, such that the network device can determine the current radio beam configuration based on the current information data.

In an example, the historical radio beam configurations may include historical radio beam configurations for radio beams at the network device for transmission to the terminal device and/or reception from the terminal device, and/or radio beams at the terminal device for transmission to the network device and/or reception from the network device. The current radio beam configuration may include a current radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

In an example, the historical information data may include one or more of: historical channel configurations or measurements between the terminal device and the network device over one or more carriers or sub-carriers, historical channel configurations or measurements between the terminal device and one or more other network devices, or historical geographical positions (e.g., GPS coordinates) of the terminal device. In particular, the historical channel configurations may include historical cell and/or sector configurations, historical time-frequency resource allocations, historical beamforming weight matrixes or vectors, and/or historical radio beam direction parameters, and the historical channel measurements may include historical measurements on CSI received signal power or received signal strength, spatial channel status, angle of signal arrival, angle of signal departure, and/or channel status of antenna panel or array. The current information data may include one or more of: a current channel configuration or measurement between the terminal device and the network device over one or more carriers or sub-carriers, a current channel configuration or measurement between the terminal device and one or more other network devices, or a current geographical position (e.g., GPS coordinates) of the terminal device. In particular, the current channel configuration may include a current cell and/or sector configuration, a current time-frequency resource allocation, a current beamforming weight matrix or vector, and/or a current radio beam direction parameter, and the current channel measurement may include current measurement on CSI, received signal power or received signal strength, spatial channel status, angle of signal arrival, angle of signal departure, and/or channel status of an antenna panel or array.

Here, the network device and the one or more other network devices may include network devices serving the terminal device in a DC, MC or CA configuration, or TRPs in a CoMP set for the terminal device. The network device and the one or more other network devices may include network devices utilizing different RATs, e.g., NR or LTE or non-3GPP RATs such as WLAN.

In an example, the probabilistic mechanism, algorithm or policy can be created or trained by means of neural network based machine learning, SVM or Bayesian statistical estimation.

Figure 4:
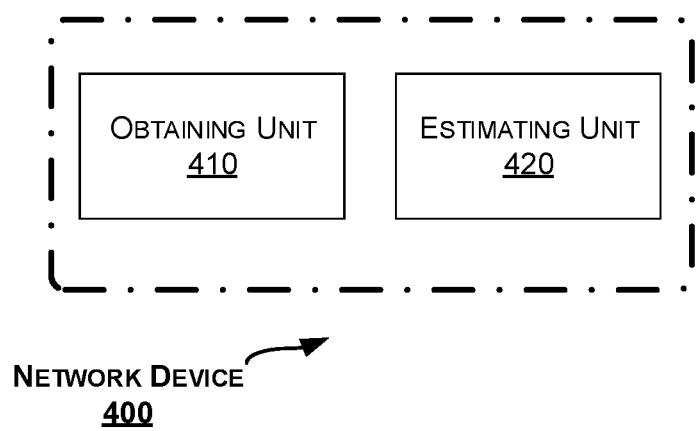
FIG. 4 is a block diagram of a network device according to an embodiment of the present disclosure.

Correspondingly to the method 100 as described above, a network device is provided. FIG. 4 is a block diagram of a network device 400 according to an embodiment of the present disclosure.

As shown in FIG. 4, the network device 400 includes an obtaining unit 410 configured to obtain current information data related to a terminal device. The network device 400 further includes an estimating unit 420 configured to estimate a candidate radio beam configuration for communication with the terminal device based on the current information data by using a probabilistic mechanism, algorithm or policy that is obtained by analyzing historical radio beam configurations for communication with the terminal device and history information data related to the terminal.

In an embodiment, the historical radio beam configurations may include historical radio beam configurations for radio beams at the network device for transmission to the terminal device and/or reception from the terminal device, and/or radio beams at the terminal device for transmission to the network device and/or reception from the network device, and/or the candidate radio beam configuration may include a candidate radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

In an embodiment, the historical information data may include one or more of: historical channel configurations or measurements between the terminal device and the network device over one or more carriers or sub-carriers, historical channel configurations or measurements between the terminal device and one or more other network devices, or historical geographical positions of the terminal device. The current information data may include one or more of: a current channel configuration or measurement between the terminal device and the network device over one or more carriers or sub-carriers, a current channel configuration or measurement between the terminal device and one or more other network devices, or a current geographical position of the terminal device.

In an embodiment, the historical channel configurations may include historical cell and/or sector configurations, historical time-frequency resource allocations, historical beamforming weight matrixes or vectors, and/or historical radio beam direction parameters, and the current channel configuration may include a current cell and/or sector configuration, a current time-frequency resource allocation, a current beamforming weight matrix or vector, and/or a current radio beam direction parameter.

In an embodiment, the historical channel measurements may include historical measurements on CSI received signal power or received signal strength, spatial channel status, angle of signal arrival, angle of signal departure, and/or channel status of antenna panel or array, and/or the current channel measurement may include a current measurement on CSI, received signal power or received signal strength, spatial channel status, angle of signal arrival, angle of signal departure, and/or channel status of an antenna panel or array.

In an embodiment, the network device and the one or more other network devices may include network devices serving the terminal device in a DC, MC or CA configuration, or TRPs in a CoMP set for the terminal device.

In an embodiment, the network device and the one or more other network devices may include network devices utilizing different RATs.

In an embodiment, each historical radio beam configuration may be associated with one or more pieces of the historical information data that are obtained in association with the historical radio beam configuration, or occur within a predetermined time period relative to the historical radio beam configuration.

In an embodiment, the estimating unit 420 may be configured to select, as the candidate radio beam configuration, one of the historical radio beam configurations that has a highest conditional probability given the current information data, by using the probabilistic mechanism, algorithm or policy.

In an embodiment, the network device 400 may further include a determining unit configured to determine the candidate radio beam configuration as a current radio beam configuration for communication with the terminal device.

In an embodiment, the network device 400 may further include a determining unit configured to determine the candidate radio beam configuration as a current radio beam configuration for communication with the terminal device only when the highest conditional probability is higher than or equal to a predetermined threshold, or determine the current radio beam configuration for communication with the terminal device based on CSI measured at the network device or received from the terminal device, when the highest conditional probability is lower than the predetermined threshold.

In an embodiment, the network device 400 may further include an updating unit configured to update the historical radio beam configurations with the current radio beam configuration, and update the historical information data with the current information data; and/or update the probabilistic mechanism, algorithm or policy in accordance with the updated historical beam configurations and the updated historical information data.

In an embodiment, the network device 400 may further include a signaling unit configured to signal the current radio beam configuration to the terminal device.

In an embodiment, the probabilistic mechanism, algorithm or policy may be created or trained at the network device.

In an embodiment, the probabilistic mechanism, algorithm or policy may be created or trained by means of neural network based machine learning, SVM or Bayesian statistical estimation.

In an embodiment, the network device 400 may further include a recording unit configured to record the historical radio beam configurations and the history information data at the network device. The historical information data and the current information data are measured at the network device and/or received from the terminal device.

In an embodiment, the network device 400 may further include a receiving unit configured to receive the probabilistic mechanism, algorithm or policy from a network node.

In an embodiment, the network device 400 may further include a signaling unit configured to signal the current radio beam configuration and the current information data to the network node.

The obtaining unit 410 and the estimating unit 420 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 5:
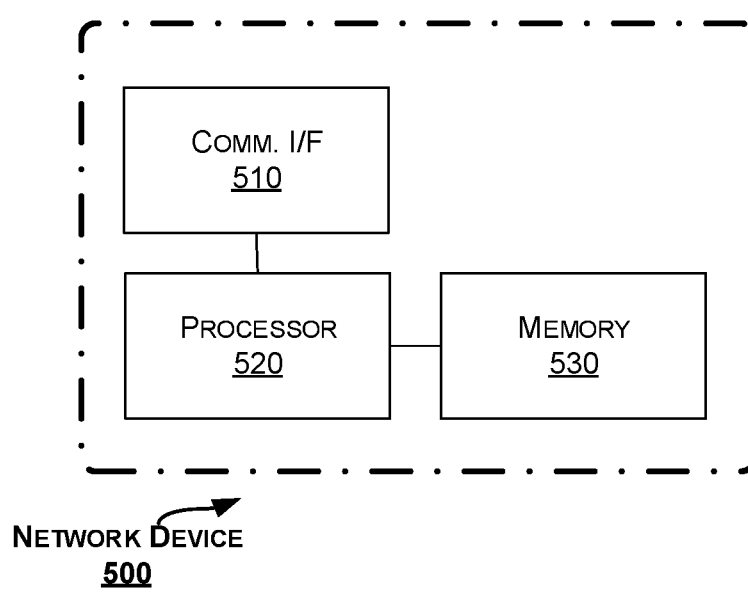
FIG. 5 is a block diagram of a network device according to another embodiment of the present disclosure.

FIG. 5 is a block diagram of a network device 500 according to another embodiment of the present disclosure.

The network device 500 includes a communication interface 510, a processor 520 and a memory 530. The memory 530 contains instructions executable by the processor 520 whereby the network device 500 is operative to perform the actions, e.g., of the procedure described earlier in conjunction with FIG. 1. Particularly, the memory 530 contains instructions executable by the processor 520 whereby the network device 500 is operative to: obtain current information data related to a terminal device; and estimate a candidate radio beam configuration for communication with the terminal device based on the current information data by using a probabilistic mechanism, algorithm or policy that is obtained by analyzing historical radio beam configurations for communication with the terminal device and history information data related to the terminal.

In an embodiment, the historical radio beam configurations may include historical radio beam configurations for radio beams at the network device for transmission to the terminal device and/or reception from the terminal device, and/or radio beams at the terminal device for transmission to the network device and/or reception from the network device, and/or the candidate radio beam configuration may include a candidate radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

In an embodiment, the historical information data may include one or more of: historical channel configurations or measurements between the terminal device and the network device over one or more carriers or sub-carriers, historical channel configurations or measurements between the terminal device and one or more other network devices, or historical geographical positions of the terminal device. The current information data may include one or more of: a current channel configuration or measurement between the terminal device and the network device over one or more carriers or sub-carriers, a current channel configuration or measurement between the terminal device and one or more other network devices, or a current geographical position of the terminal device.

In an embodiment, the historical channel configurations may include historical cell and/or sector configurations, historical time-frequency resource allocations, historical beamforming weight matrixes or vectors, and/or historical radio beam direction parameters, and the current channel configuration may include a current cell and/or sector configuration, a current time-frequency resource allocation, a current beamforming weight matrix or vector, and/or a current radio beam direction parameter.

In an embodiment, the historical channel measurements may include historical measurements on CSI received signal power or received signal strength, spatial channel status, angle of signal arrival, angle of signal departure, and/or channel status of antenna panel or array, and/or the current channel measurement may include a current measurement on CSI, received signal power or received signal strength, spatial channel status, angle of signal arrival, angle of signal departure, and/or channel status of an antenna panel or array.

In an embodiment, the network device and the one or more other network devices may include network devices serving the terminal device in a Dual Connectivity (DC), Multiple Connectivity (MC) or Carrier Aggregation (CA) configuration, or Transmitting/Receiving Points (TRPs) in a Coordinated Multi-Point (CoMP) set for the terminal device.

In an embodiment, the network device and the one or more other network devices may include network devices utilizing different Radio Access Technologies (RATs).

In an embodiment, each historical radio beam configuration may be associated with one or more pieces of the historical information data that are obtained in association with the historical radio beam configuration, or occur within a predetermined time period relative to the historical radio beam configuration.

In an embodiment, the operation of estimating may include: selecting, as the candidate radio beam configuration, one of the historical radio beam configurations that has a highest conditional probability given the current information data, by using the probabilistic mechanism, algorithm or policy.

In an embodiment, the memory 530 may further contain instructions executable by the processor 520 whereby the network device 500 is operative to: determine the candidate radio beam configuration as a current radio beam configuration for communication with the terminal device.

In an embodiment, the memory 530 may further contain instructions executable by the processor 520 whereby the network device 500 is operative to: determine the candidate radio beam configuration as a current radio beam configuration for communication with the terminal device only when the highest conditional probability is higher than or equal to a predetermined threshold, or determine the current radio beam configuration for communication with the terminal device based on CSI measured at the network device or received from the terminal device, when the highest conditional probability is lower than the predetermined threshold.

In an embodiment, the memory 530 may further contain instructions executable by the processor 520 whereby the network device 500 is operative to: update the historical radio beam configurations with the current radio beam configuration, and update the historical information data with the current information data; and/or update the probabilistic mechanism, algorithm or policy in accordance with the updated historical beam configurations and the updated historical information data.

In an embodiment, the memory 530 may further contain instructions executable by the processor 520 whereby the network device 500 is operative to: signal the current radio beam configuration to the terminal device.

In an embodiment, the probabilistic mechanism, algorithm or policy may be created or trained at the network device.

In an embodiment, the probabilistic mechanism, algorithm or policy may be created or trained by means of neural network based machine learning, SVM or Bayesian statistical estimation.

In an embodiment, the memory 530 may further contain instructions executable by the processor 520 whereby the network device 500 is operative to: record the historical radio beam configurations and the history information data at the network device. The historical information data and the current information data are measured at the network device and/or received from the terminal device.

In an embodiment, the memory 530 may further contain instructions executable by the processor 520 whereby the network device 500 is operative to: receive the probabilistic mechanism, algorithm or policy from a network node.

In an embodiment, the memory 530 may further contain instructions executable by the processor 520 whereby the network device 500 is operative to: signal the current radio beam configuration and the current information data to the network node.

Figure 6:
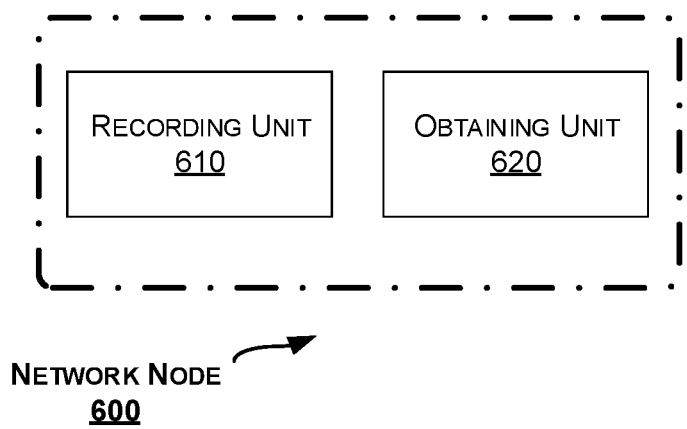
FIG. 6 is a block diagram of a network node according to an embodiment of the present disclosure.

Correspondingly to the method 200 as described above, a network node is provided. FIG. 6 is a block diagram of a network node 600 according to an embodiment of the present disclosure.

As shown in FIG. 6, the network node 600 includes a recording unit 610 configured to record historical radio beam configurations for communication between a network device and a terminal device and history information data related to the terminal. The network node 600 further includes an obtaining unit 620 configured to obtain a probabilistic mechanism, algorithm or policy by analyzing the historical radio beam configurations and the history information data.

In an embodiment, the historical radio beam configurations may include historical radio beam configurations for radio beams at the network device for transmission to the terminal device and/or reception from the terminal device, and/or radio beams at the terminal device for transmission to the network device and/or reception from the network device, and/or the candidate radio beam configuration may include a candidate radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

In an embodiment, the historical information data may include one or more of: historical channel configurations or measurements between the terminal device and the network device over one or more carriers or sub-carriers, historical channel configurations or measurements between the terminal device and one or more other network devices, or historical geographical positions of the terminal device. The current information data may include one or more of: a current channel configuration or measurement between the terminal device and the network device over one or more carriers or sub-carriers, a current channel configuration or measurement between the terminal device and one or more other network devices, or a current geographical position of the terminal device.

In an embodiment, the historical channel configurations may include historical cell and/or sector configurations, historical time-frequency resource allocations, historical beamforming weight matrixes or vectors, and/or historical radio beam direction parameters, and the current channel configuration may include a current cell and/or sector configuration, a current time-frequency resource allocation, a current beamforming weight matrix or vector, and/or a current radio beam direction parameter.

In an embodiment, the historical channel measurements may include historical measurements on CSI received signal power or received signal strength, spatial channel status, angle of signal arrival, angle of signal departure, and/or channel status of antenna panel or array, and/or the current channel measurement may include a current measurement on CSI, received signal power or received signal strength, spatial channel status, angle of signal arrival, angle of signal departure, and/or channel status of an antenna panel or array.

In an embodiment, the network device and the one or more other network devices may include network devices serving the terminal device in a DC, MC or CA configuration, or TRPs in a CoMP set for the terminal device.

In an embodiment, the network device and the one or more other network devices may include network devices utilizing different RATs.

In an embodiment, each historical radio beam configuration may be associated with one or more pieces of the historical information data that are obtained in association with the historical radio beam configuration, or occur within a predetermined time period relative to the historical radio beam configuration.

In an embodiment, the network node 600 may further include a receiving unit configured to receive current information data related to the terminal; and an estimating unit configured to estimate a candidate radio beam configuration for communication between the network device and the terminal device based on the current information data by using the probabilistic mechanism, algorithm or policy.

In an embodiment, the estimating unit is configured to: select, as the candidate radio beam configuration, one of the historical radio beam configurations that has a highest conditional probability given the current information data, by using the probabilistic mechanism, algorithm or policy.

In an embodiment, the network node 600 may further include a determining unit configured to determine the candidate radio beam configuration as a current radio beam configuration for communication between the network device and the terminal device.

In an embodiment, the network node 600 may further include a determining unit configured to determine the candidate radio beam configuration as a current radio beam configuration for communication between the network device and the terminal device only when the highest conditional probability is higher than or equal to a predetermined threshold.

In an embodiment, the network node 600 may further include an updating unit configured to update the historical radio beam configurations with the current radio beam configuration, and update the historical information data with the current information data; and/or update the probabilistic mechanism, algorithm or policy in accordance with the updated historical beam configurations and the updated historical information data.

In an embodiment, the network node 600 may further include a signaling unit configured to signal the probabilistic mechanism, algorithm or policy to the network device, to enable the network device to determine a current radio beam configuration for communication between the network device and the terminal device based on current information data related to the terminal by using the probabilistic mechanism, algorithm or policy.

In an embodiment, the network node 600 may further include a receiving unit configured to receive the current radio beam configuration and the current information data from the network device; and an updating unit configured to update the historical radio beam configurations with the current radio beam configuration, and update the historical information data with the current information data; and/or update the probabilistic mechanism, algorithm or policy in accordance with the updated historical beam configurations and the updated historical information data.

In an embodiment, the probabilistic mechanism, algorithm or policy is created or trained by means of neural network based machine learning, SVM or Bayesian statistical estimation.

In an embodiment, the network node 600 may further include a transmitting unit configured to transmit to at least the network device an instruction to report the historical radio beam configurations, the historical information data and/or the current information data to the network node; and a receiving unit configured to receive the historical radio beam configurations, the historical information data and/or the current information data from at least the network device.

In an embodiment, the network node 600 may further include a configuring unit configured to configure channel measurement parameters for at least the network device, the channel measurement parameters including one or more of: a period at which channel measurements are to be performed, a measurement type, a data sharing or exchanging protocol between at least the network device and the network node, or a reference signal configuration. The historical information data and/or the current information data may be at least partially obtained by at least the network device performing channel measurements in accordance with the channel measurement parameters.

In an embodiment, the network node may be a centralized control node or a coordinating device, an OAM node of a core network or a RAN, an edge computing node, or a server accessible by the network device.

The recording unit 610 and the obtaining unit 620 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 7:
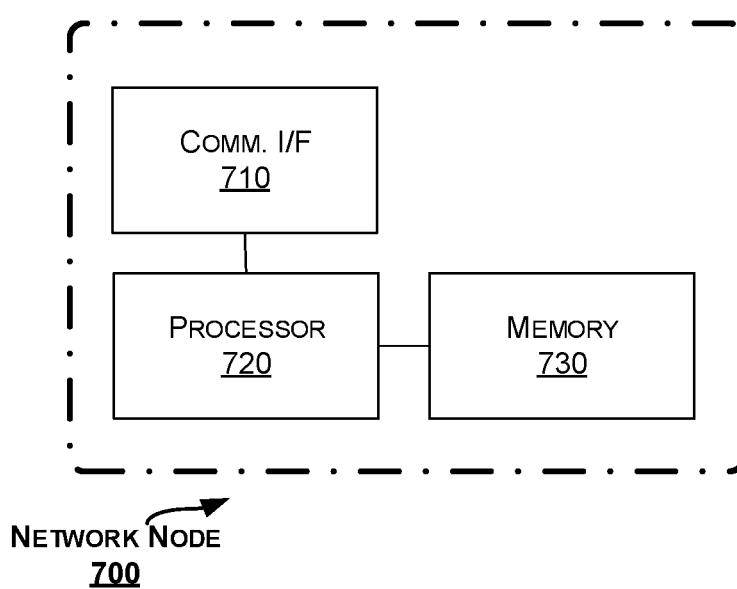
FIG. 7 is a block diagram of a network node according to another embodiment of the present disclosure.

FIG. 7 is a block diagram of a network node 700 according to another embodiment of the present disclosure.

The network node 700 includes a communication interface 710, a processor 720 and a memory 730. The memory 730 contains instructions executable by the processor 720 whereby the network node 700 is operative to perform the actions, e.g., of the procedure described earlier in conjunction with FIG. 2. Particularly, the memory 730 contains instructions executable by the processor 720 whereby the network node 700 is operative to: record historical radio beam configurations for communication between a network device and a terminal device and history information data related to the terminal; and obtain a probabilistic mechanism, algorithm or policy by analyzing the historical radio beam configurations and the history information data.

In an embodiment, the historical radio beam configurations may include historical radio beam configurations for radio beams at the network device for transmission to the terminal device and/or reception from the terminal device, and/or radio beams at the terminal device for transmission to the network device and/or reception from the network device, and/or the candidate radio beam configuration may include a candidate radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

In an embodiment, the historical information data may include one or more of: historical channel configurations or measurements between the terminal device and the network device over one or more carriers or sub-carriers, historical channel configurations or measurements between the terminal device and one or more other network devices, or historical geographical positions of the terminal device. The current information data may include one or more of: a current channel configuration or measurement between the terminal device and the network device over one or more carriers or sub-carriers, a current channel configuration or measurement between the terminal device and one or more other network devices, or a current geographical position of the terminal device.

In an embodiment, the historical channel configurations may include historical cell and/or sector configurations, historical time-frequency resource allocations, historical beamforming weight matrixes or vectors, and/or historical radio beam direction parameters, and the current channel configuration may include a current cell and/or sector configuration, a current time-frequency resource allocation, a current beamforming weight matrix or vector, and/or a current radio beam direction parameter.

In an embodiment, the historical channel measurements may include historical measurements on CSI received signal power or received signal strength, spatial channel status, angle of signal arrival, angle of signal departure, and/or channel status of antenna panel or array, and/or the current channel measurement may include a current measurement on CSI, received signal power or received signal strength, spatial channel status, angle of signal arrival, angle of signal departure, and/or channel status of an antenna panel or array.

In an embodiment, the network device and the one or more other network devices may include network devices serving the terminal device in a DC, MC or CA configuration, or TRPs in a CoMP set for the terminal device.

In an embodiment, the network device and the one or more other network devices may include network devices utilizing different RATs.

In an embodiment, each historical radio beam configuration may be associated with one or more pieces of the historical information data that are obtained in association with the historical radio beam configuration, or occur within a predetermined time period relative to the historical radio beam configuration.

In an embodiment, the memory 730 may further contain instructions executable by the processor 720 whereby the network node 700 is operative to: receive current information data related to the terminal; and estimate a candidate radio beam configuration for communication between the network device and the terminal device based on the current information data by using the probabilistic mechanism, algorithm or policy.

In an embodiment, the operation of estimating may include: selecting, as the candidate radio beam configuration, one of the historical radio beam configurations that has a highest conditional probability given the current information data, by using the probabilistic mechanism, algorithm or policy.

In an embodiment, the memory 730 may further contain instructions executable by the processor 720 whereby the network node 700 is operative to: determine the candidate radio beam configuration as a current radio beam configuration for communication between the network device and the terminal device.

In an embodiment, the memory 730 may further contain instructions executable by the processor 720 whereby the network node 700 is operative to: determine the candidate radio beam configuration as a current radio beam configuration for communication between the network device and the terminal device only when the highest conditional probability is higher than or equal to a predetermined threshold.

In an embodiment, the memory 730 may further contain instructions executable by the processor 720 whereby the network node 700 is operative to: update the historical radio beam configurations with the current radio beam configuration, and update the historical information data with the current information data; and/or update the probabilistic mechanism, algorithm or policy in accordance with the updated historical beam configurations and the updated historical information data.

In an embodiment, the memory 730 may further contain instructions executable by the processor 720 whereby the network node 700 is operative to: signal the probabilistic mechanism, algorithm or policy to the network device, to enable the network device to determine a current radio beam configuration for communication between the network device and the terminal device based on current information data related to the terminal by using the probabilistic mechanism, algorithm or policy.

In an embodiment, the memory 730 may further contain instructions executable by the processor 720 whereby the network node 700 is operative to: receive the current radio beam configuration and the current information data from the network device; update the historical radio beam configurations with the current radio beam configuration, and update the historical information data with the current information data; and/or update the probabilistic mechanism, algorithm or policy in accordance with the updated historical beam configurations and the updated historical information data.

In an embodiment, the probabilistic mechanism, algorithm or policy is created or trained by means of neural network based machine learning, SVM or Bayesian statistical estimation.

In an embodiment, the memory 730 may further contain instructions executable by the processor 720 whereby the network node 700 is operative to: transmit to at least the network device an instruction to report the historical radio beam configurations, the historical information data and/or the current information data to the network node; and receive the historical radio beam configurations, the historical information data and/or the current information data from at least the network device.

In an embodiment, the memory 730 may further contain instructions executable by the processor 720 whereby the network node 700 is operative to: configure channel measurement parameters for at least the network device, the channel measurement parameters including one or more of: a period at which channel measurements are to be performed, a measurement type, a data sharing or exchanging protocol between at least the network device and the network node, or a reference signal configuration. The historical information data and/or the current information data may be at least partially obtained by at least the network device performing channel measurements in accordance with the channel measurement parameters.

In an embodiment, the network node may be a centralized control node or a coordinating device, an OAM node of a core network or a RAN, an edge computing node, or a server accessible by the network device.

Figure 8:
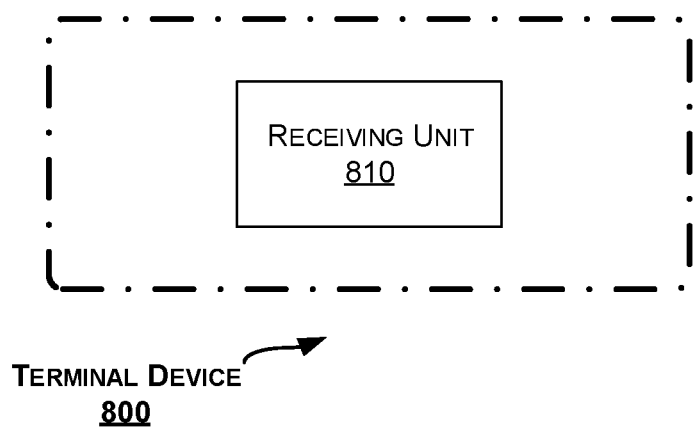
FIG. 8 is a block diagram of a terminal device according to an embodiment of the present disclosure.

Correspondingly to the method 300 as described above, a terminal device is provided. FIG. 8 is a block diagram of a terminal device 800 according to an embodiment of the present disclosure.

As shown in FIG. 8, the terminal device 800 includes a receiving unit 810 configured to receive from a network device a current radio beam configuration for communication with the network device. The current radio beam configuration is determined based on current information data related to the terminal device by using a probabilistic mechanism, algorithm or policy that is obtained by analyzing historical radio beam configurations for communication with the network device and history information data related to the terminal.

In an embodiment, the historical radio beam configurations may include historical radio beam configurations for radio beams at the network device for transmission to the terminal device and/or reception from the terminal device, and/or radio beams at the terminal device for transmission to the network device and/or reception from the network device, and/or the current radio beam configuration may include a current radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

In an embodiment, the historical information data may include one or more of: historical channel configurations or measurements between the terminal device and the network device over one or more carriers or sub-carriers, historical channel configurations or measurements between the terminal device and one or more other network devices, or historical geographical positions of the terminal device. The current information data may include one or more of: a current channel configuration or measurement between the terminal device and the network device over one or more carriers or sub-carriers, a current channel configuration or measurement between the terminal device and one or more other network devices, or a current geographical position of the terminal device.

In an embodiment, the historical channel configurations may include historical cell and/or sector configurations, historical time-frequency resource allocations, historical beamforming weight matrixes or vectors, and/or historical radio beam direction parameters, and the current channel configuration may include a current cell and/or sector configuration, a current time-frequency resource allocation, a current beamforming weight matrix or vector, and/or a current radio beam direction parameter.

In an embodiment, the historical channel measurements may include historical measurements on CSI received signal power or received signal strength, spatial channel status, angle of signal arrival, angle of signal departure, and/or channel status of antenna panel or array, and/or the current channel measurement may include a current measurement on CSI, received signal power or received signal strength, spatial channel status, angle of signal arrival, angle of signal departure, and/or channel status of an antenna panel or array.

In an embodiment, the network device and the one or more other network devices may include network devices serving the terminal device in a DC, MC or CA configuration, or TRPs in a CoMP set for the terminal device.

In an embodiment, the network device and the one or more other network devices may include network devices utilizing different RATs.

In an embodiment, the probabilistic mechanism, algorithm or policy is created or trained by means of neural network based machine learning, SVM or Bayesian statistical estimation.

In an embodiment, the terminal device 800 may further include a transmitting unit configured to transmit the current information data to the network device.

The receiving unit 810 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 9:
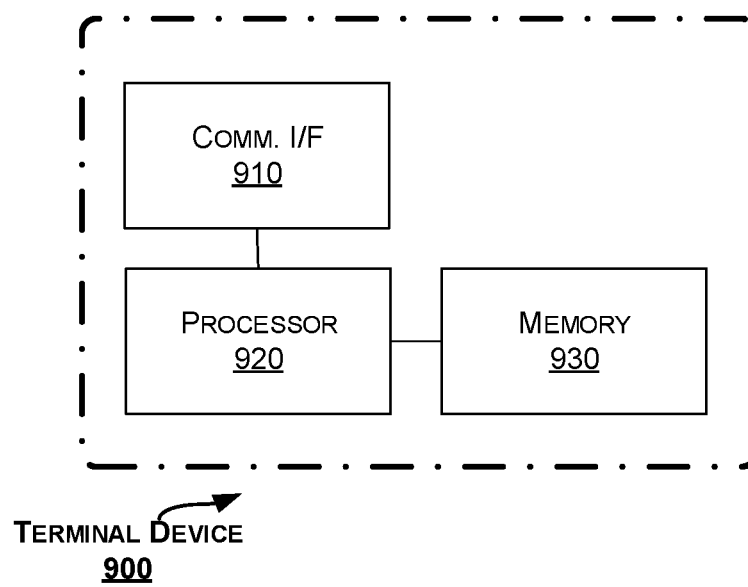
FIG. 9 is a block diagram of a terminal device according to another embodiment of the present disclosure.

FIG. 9 is a block diagram of a terminal device 900 according to another embodiment of the present disclosure.

The terminal device 900 includes a communication interface 910, a processor 920 and a memory 930. The memory 930 contains instructions executable by the processor 920 whereby the terminal device 900 is operative to perform the actions, e.g., of the procedure described earlier in conjunction with FIG. 3. Particularly, the memory 930 contains instructions executable by the processor 920 whereby the terminal device 900 is operative to: receive from a network device a current radio beam configuration for communication with the network device. The current radio beam configuration is determined based on current information data related to the terminal device by using a probabilistic mechanism, algorithm or policy that is obtained by analyzing historical radio beam configurations for communication with the network device and history information data related to the terminal.

In an embodiment, the historical radio beam configurations may include historical radio beam configurations for radio beams at the network device for transmission to the terminal device and/or reception from the terminal device, and/or radio beams at the terminal device for transmission to the network device and/or reception from the network device, and/or the current radio beam configuration may include a current radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

In an embodiment, the historical information data may include one or more of: historical channel configurations or measurements between the terminal device and the network device over one or more carriers or sub-carriers, historical channel configurations or measurements between the terminal device and one or more other network devices, or historical geographical positions of the terminal device. The current information data may include one or more of: a current channel configuration or measurement between the terminal device and the network device over one or more carriers or sub-carriers, a current channel configuration or measurement between the terminal device and one or more other network devices, or a current geographical position of the terminal device.

In an embodiment, the historical channel configurations may include historical cell and/or sector configurations, historical time-frequency resource allocations, historical beamforming weight matrixes or vectors, and/or historical radio beam direction parameters, and the current channel configuration may include a current cell and/or sector configuration, a current time-frequency resource allocation, a current beamforming weight matrix or vector, and/or a current radio beam direction parameter.

In an embodiment, the historical channel measurements may include historical measurements on CSI received signal power or received signal strength, spatial channel status, angle of signal arrival, angle of signal departure, and/or channel status of antenna panel or array, and/or the current channel measurement may include a current measurement on CSI, received signal power or received signal strength, spatial channel status, angle of signal arrival, angle of signal departure, and/or channel status of an antenna panel or array.

In an embodiment, the network device and the one or more other network devices may include network devices serving the terminal device in a DC, MC or CA configuration, or TRPs in a CoMP set for the terminal device.

In an embodiment, the network device and the one or more other network devices may include network devices utilizing different RATs.

In an embodiment, the probabilistic mechanism, algorithm or policy is created or trained by means of neural network based machine learning, SVM or Bayesian statistical estimation.

In an embodiment, the memory 930 may further contain instructions executable by the processor 920 whereby the terminal device 900 is operative to transmit the current information data to the network device.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 520 causes the network device 500 to perform the actions, e.g., of the procedure described earlier in conjunction with FIG. 1; or code/computer readable instructions, which when executed by the processor 720 causes the network node 700 to perform the actions, e.g., of the procedure described earlier in conjunction with FIG. 2; or code/computer readable instructions, which when executed by the processor 920 causes the terminal device 900 to perform the actions, e.g., of the procedure described earlier in conjunction with FIG. 3.

The computer program product may be configured as a computer program code structured in computer program modules. The computer program modules could essentially perform the actions of the flow illustrated in FIG. 1, 2 or 3.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 10:
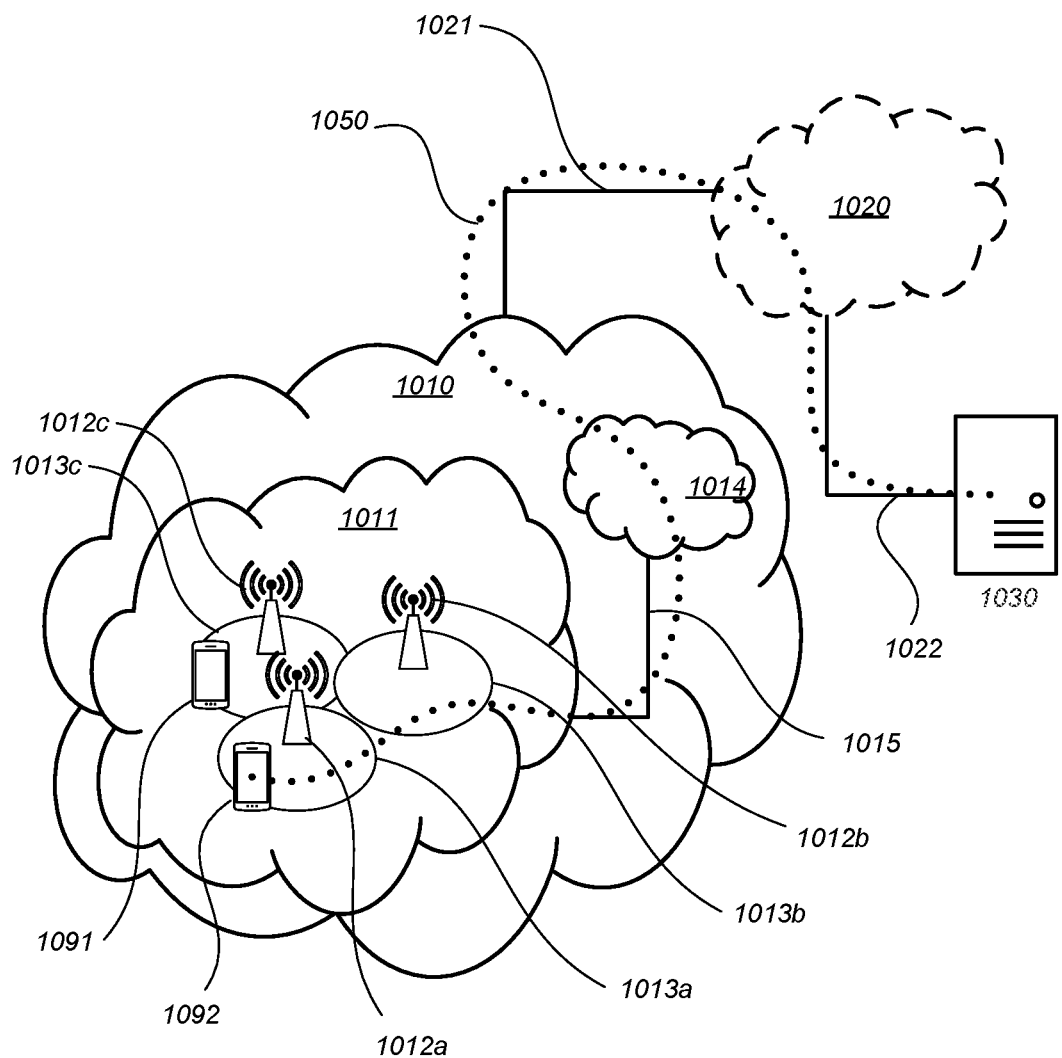
FIG. 10 schematically illustrates a telecommunication network connected via an intermediate network to a host computer.

With reference to FIG. 10, in accordance with an embodiment, a communication system includes a telecommunication network 1010, such as a 3GPP-type cellular network, which comprises an access network 1011, such as a radio access network, and a core network 1014. The access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to the core network 1014 over a wired or wireless connection 1015. A first user equipment (UE) 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 may not or need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data which is transmitted using the OTT connection 1150.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120. The communication interface 1126 may be configured to facilitate a connection 1160 to the host computer 1110. The connection 1160 may be direct or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

Figure 11:
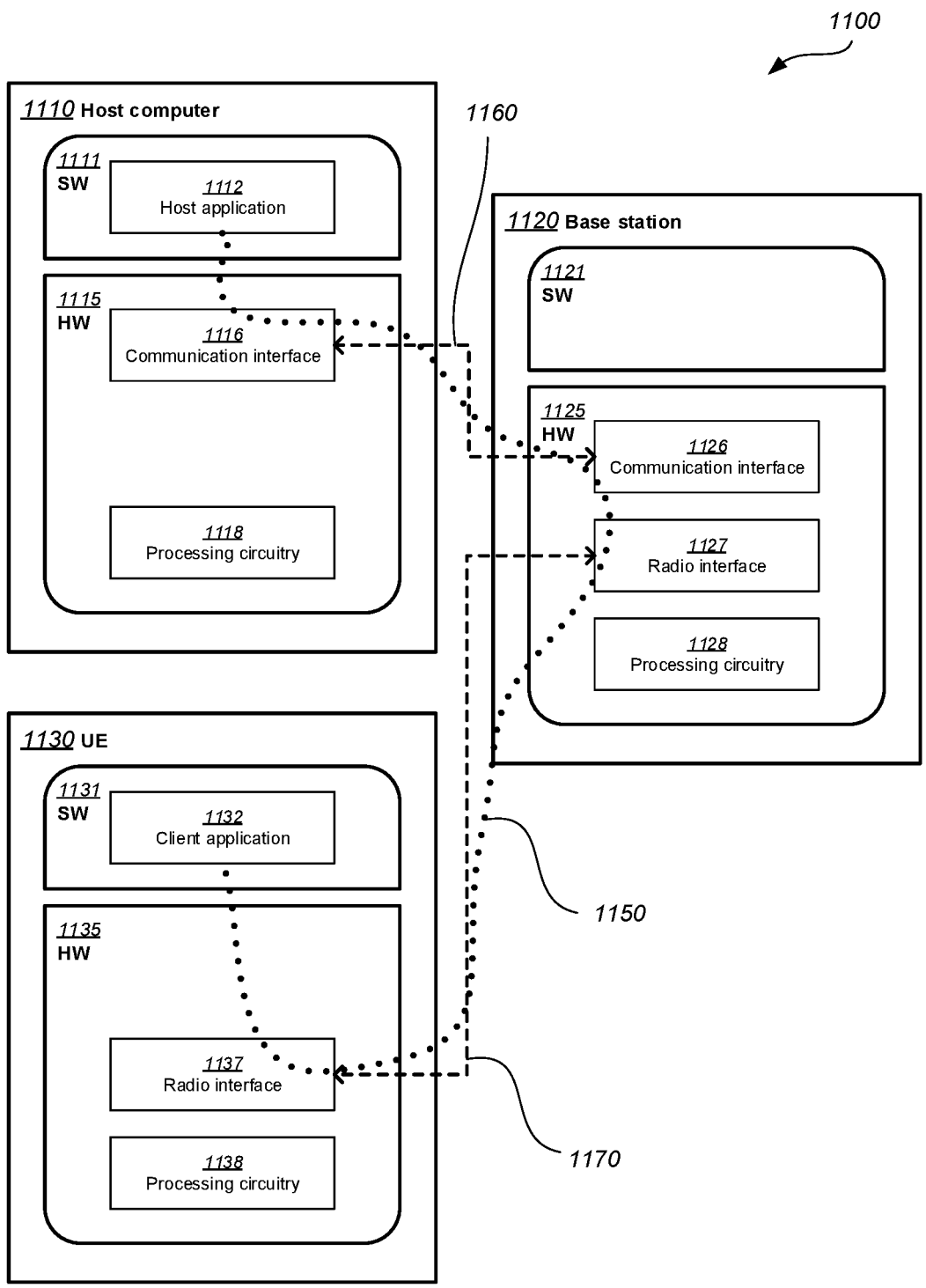
FIG. 11 is a generalized block diagram of a host computer communicating via a base station with a user equipment over a partially wireless connection.

It is noted that the host computer 1110, base station 1120 and UE 1130 illustrated in FIG. 11 may be identical to the host computer 1030, one of the base stations 1012*a*, 1012*b*, 1012*c* and one of the UEs 1091, 1092 of FIG. 10, respectively. This is to say, the inner workings of these entities may be as shown in FIG. 11 and independently, the surrounding network topology may be that of FIG. 10.

In FIG. 11, the OTT connection 1150 has been drawn abstractly to illustrate the communication between the host computer 1110 and the use equipment 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may improve the radio resource utilization and data rate, and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1111 measurements of throughput, propagation times, latency and the like. The measurements may be implemented in that the software 1111, 1131 causes messages to be transmitted, in particular empty or 'dummy' messages, using the OTT connection 1150 while it monitors propagation times, errors etc.

Figure 12:
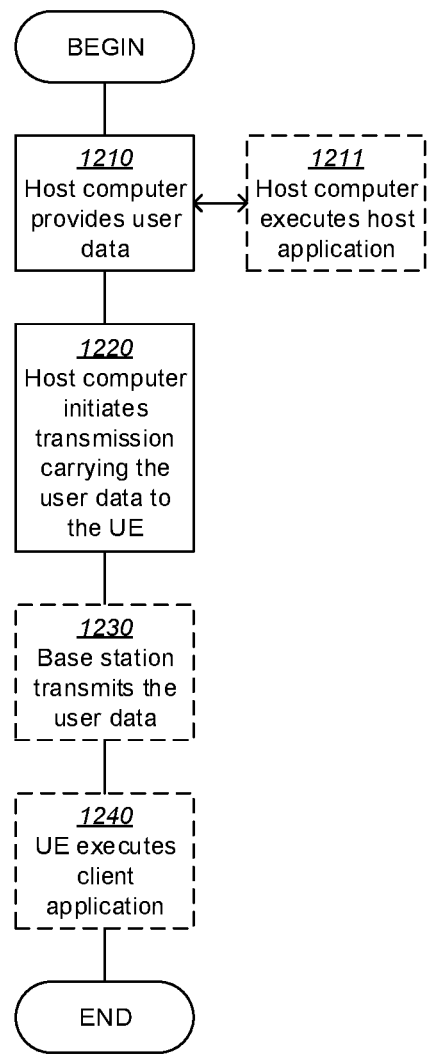

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

Figure 13:
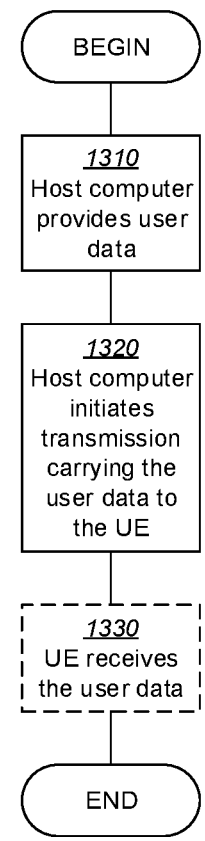

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 1410 of the method, the UE receives input data provided by the host computer. Additionally or alternatively, in an optional second step 1420, the UE provides user data. In an optional substep 1421 of the second step 1420, the UE provides the user data by executing a client application. In a further optional substep 1411 of the first step 1410, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1430, transmission of the user data to the host computer. In a fourth step 1440 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 1510 of the method, in accordance with the teachings of the embodiments described throughout this disclosure, the base station receives user data from the UE. In an optional second step 1520, the base station initiates transmission of the received user data to the host computer. In a third step 1530, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device for radio beam determination, comprising:
obtaining current information data related to a terminal device, the current information data comprising at least one of:
a current channel configuration or measurement between the terminal device and the network device over one or more carriers or sub-carriers; and
a current channel configuration or measurement between the terminal device and one or more other network devices;
estimating a candidate radio beam configuration for communication with the terminal device based on the current information data by using a probabilistic mechanism, algorithm or policy that is obtained by analyzing historical radio beam configurations for communication with the terminal device and history information data related to the terminal, the history information data comprising at least one of:
historical channel configurations or measurements between the terminal device and the network device over one or more carriers or sub-carriers; and
historical channel configurations or measurements between the terminal device and one or more other network devices; and
selecting, as the candidate radio beam configuration, one of the historical radio beam configurations that has a highest conditional probability given the current information data.

2. The method of claim 1, wherein
the historical radio beam configurations comprise historical radio beam configurations for radio beams at the network device for transmission to the terminal device and/or reception from the terminal device, and/or radio beams at the terminal device for transmission to the network device and/or reception from the network device, and/or
the candidate radio beam configuration comprises a candidate radio beam configuration for a radio beam at the network device for transmission to the terminal device, a radio beam at the network device for reception from the terminal device, a radio beam at the terminal device for transmission to the network device, and/or a radio beam at the terminal device for reception from the network device.

3. The method of claim 1, wherein
the historical channel configurations comprise historical cell and/or sector configurations, historical time-frequency resource allocations, historical beamforming weight matrixes or vectors, and/or historical radio beam direction parameters, and
the current channel configuration comprises a current cell and/or sector configuration, a current time-frequency resource allocation, a current beamforming weight matrix or vector, and/or a current radio beam direction parameter.

4. The method of claim 1, wherein
the historical channel measurements comprise historical measurements on Channel State Information (CSI), received signal power or received signal strength, spatial channel status, angle of signal arrival, angle of signal departure, and/or channel status of antenna panel or array, and/or
the current channel measurement comprises a current measurement on CSI, received signal power or received signal strength, spatial channel status, angle of signal arrival, angle of signal departure, and/or channel status of an antenna panel or array.

5. The method of claim 1, wherein the network device and the one or more other network devices comprise network devices serving the terminal device in a Dual Connectivity, DC, Multiple Connectivity (MC), or Carrier Aggregation (CA), configuration, or Transmitting/Receiving Points (TRPs), in a Coordinated Multi-Point (COMP), set for the terminal device.

6. The method of claim 1, wherein the network device and the one or more other network devices comprise network devices utilizing different Radio Access Technologies (RATs).

7. The method of claim 1, wherein each historical radio beam configuration is associated with one or more pieces of the history information data that are obtained in association with the historical radio beam configuration, or occur within a predetermined time period relative to the historical radio beam configuration.

8. The method of claim 1, further comprising:
determining the candidate radio beam configuration as a current radio beam configuration for communication with the terminal device.

9. The method of claim 1, further comprising:
determining the candidate radio beam configuration as a current radio beam configuration for communication with the terminal device only when the highest conditional probability is higher than or equal to a predetermined threshold, or
determining the current radio beam configuration for communication with the terminal device based on Channel State Information (CSI), measured at the network device or received from the terminal device, when the highest conditional probability is lower than the predetermined threshold.

10. The method of claim 8, further comprising:
signaling the current radio beam configuration to the terminal device.

11. The method of claim 1, wherein the probabilistic mechanism, algorithm or policy is created or trained at the network device.

12. The method of claim 11, wherein the probabilistic mechanism, algorithm or policy is created or trained by means of neural network based machine learning, Supporting Vector Machine (SVM), or Bayesian statistical estimation.

13. A method in a network device for radio beam determination, comprising:
obtaining current information data related to a terminal device, the current information data comprising at least one of:
a current channel configuration or measurement between the terminal device and the network device over one or more carriers or sub-carriers; and a current channel configuration or measurement between the terminal device and one or more other network devices;

estimating a candidate radio beam configuration for communication with the terminal device based on the current information data by using a probabilistic mechanism, algorithm or policy created or trained at the network device and that is obtained by analyzing historical radio beam configurations for communication with the terminal device and history information data related to the terminal;

recording the historical radio beam configurations and the history information data at the network device; and selecting, as the candidate radio beam configuration, one of the historical radio beam configurations that has a highest conditional probability given the current information data, wherein the history information data and the current information data are measured at the network device.

14. The method of claim 1, further comprising:
receiving the probabilistic mechanism, algorithm or policy from a network node.

15. A method in a network device for radio beam determination, comprising:

obtaining current information data related to a terminal device;

estimating a candidate radio beam configuration for communication with the terminal device based on the current information data by using a probabilistic mechanism, algorithm or policy received from a network node and that is obtained by analyzing historical radio beam configurations for communication with the terminal device and history information data related to the terminal;

selecting, as the candidate radio beam configuration, one of the historical radio beam configurations that has a highest conditional probability given the current information data; and signaling a current radio beam configuration and a current information data to the network node.

16. A method in a network node for facilitating radio beam determination, comprising:

recording historical radio beam configurations for communication between a network device and a terminal device and history information data related to the terminal, the history information data comprising at least one of:
 historical channel configurations or measurements between the terminal device and the network device over one or more carriers or sub-carriers; and
 historical channel configurations or measurements between the terminal device and one or more other network devices;

obtaining a probabilistic mechanism, algorithm or policy by analyzing the historical radio beam configurations and the history information data; and selecting, as a candidate radio beam configuration, one of the historical radio beam configurations that has a highest conditional probability given current information data related to the terminal device by using the probabilistic mechanism, algorithm or policy, the current information data comprising at least one of:
 a current channel configuration or measurement between the terminal device and the network device over one or more carriers or sub-carriers; and
 a current channel configuration or measurement between the terminal device and one or more other network devices.

17. A network node comprising:
a processor; and
memory coupled to the processor and having instructions stored therein that are executable by the network node to perform operations comprising:

recording historical radio beam configurations for communication between a network device and a terminal device and history information data related to the terminal, the history information data comprising at least one of:
 historical channel configurations or measurements between the terminal device and the network device over one or more carriers or sub-carriers; and
 historical channel configurations or measurements between the terminal device and one or more other network devices;

obtaining a probabilistic mechanism, algorithm or policy by analyzing the historical radio beam configurations and the history information data; and selecting, as a candidate radio beam configuration, one of the historical radio beam configurations that has a highest conditional probability given current information data related to the terminal device by using the probabilistic mechanism, algorithm or policy, the current information data comprising at least one of:
 a current channel configuration or measurement between the terminal device and the network device over one or more carriers or sub-carriers; and
 a current channel configuration or measurement between the terminal device and one or more other network devices.

18. The method of claim 1, wherein estimating the candidate radio beam configuration comprises estimating the candidate radio beam configuration for communication with the terminal device based on the current information data by using the probabilistic mechanism, algorithm or policy received from a network node,
the method further comprising:
signaling a current radio beam configuration and a current information data to the network node.

\* \* \* \* \*